(12) United States Patent
Urcola Alberdi

(10) Patent No.: US 9,399,482 B2
(45) Date of Patent: Jul. 26, 2016

(54) INNER TUBE FOR A TELESCOPIC STEERING COLUMN FOR AN AUTOMOTIVE VEHICLE, METHOD FOR FORMING A FIRST END SECTOR IN SUCH INNER TUBE AND REDUCING AND DRAWING DEVICE FOR FORMING THE END

(71) Applicant: CIE AUTOMOTIVE, S.A., Bilbao (ES)

(72) Inventor: Gaizka Urcola Alberdi, Bilbao (ES)

(73) Assignee: CIE AUTOMOTIVE, S.A., Bilbao, (Vizcaya) (ES)

( * ) Notice: Subject to any disclaimer, the term of this patent is extended or adjusted under 35 U.S.C. 154(b) by 0 days.

(21) Appl. No.: 14/430,814

(22) PCT Filed: Jun. 27, 2013

(86) PCT No.: PCT/ES2013/070428
§ 371 (c)(1),
(2) Date: Mar. 24, 2015

(87) PCT Pub. No.: WO2014/044881
PCT Pub. Date: Mar. 27, 2014

(65) Prior Publication Data
US 2015/0274189 A1   Oct. 1, 2015

(30) Foreign Application Priority Data
Sep. 24, 2012  (EP) .................................... 12382371

(51) Int. Cl.
*B62D 1/185* (2006.01)
*B21C 1/00* (2006.01)
*B21C 3/02* (2006.01)
*B21C 3/16* (2006.01)

(52) U.S. Cl.
CPC . *B62D 1/185* (2013.01); *B21C 1/00* (2013.01); *B21C 3/02* (2013.01); *B21C 3/16* (2013.01)

(58) Field of Classification Search
CPC ........ B62D 1/185; B62D 1/187; B62D 1/189; B62D 1/184; B62D 1/19; B62D 1/192; B62D 1/195; B62D 1/18; B62D 1/181; B62D 1/183; F16C 2326/24
USPC .............................. 74/493, 492; 280/775, 777
See application file for complete search history.

(56) References Cited

U.S. PATENT DOCUMENTS

| | | | |
|---|---|---|---|
| 2002/0056981 A1* | 5/2002 | Duffy | B62D 1/195 280/779 |
| 2009/0013817 A1* | 1/2009 | Schnitzer | B62D 1/184 74/493 |
| 2010/0018340 A1* | 1/2010 | Schnitzer | B62D 1/192 74/493 |
| 2010/0064839 A1* | 3/2010 | Schnitzer | B62D 1/16 74/492 |
| 2011/0260438 A1* | 10/2011 | Becker | B62D 1/181 280/777 |

FOREIGN PATENT DOCUMENTS

DE   10 2009 055021   7/2010

OTHER PUBLICATIONS

International Search Report for PCT/ES2013/070428 dated Jan. 22, 2014.

* cited by examiner

*Primary Examiner* — Keith Frisby
(74) *Attorney, Agent, or Firm* — Gottlieb, Rackman & Reisman P.C.

(57) ABSTRACT

An inner tube for a telescopic steering column (8) is provided, with a first end sector (2) for assembling a bearing (9), having a substantially circular cross-section obtained by reducing and drawing, a second end sector (3) and an intermediate sector (4) having a regular polygonal section, provided with longitudinal planar external guiding faces (5), wherein
the first end sector (2) comprises a plurality of external flanges (6) emerging longitudinally from its external surface (2a) in axial alignment with at least some of the external guiding faces (5), and a plurality of longitudinal internal recesses (7) penetrating its inner surface (2b), each internal recess (7) extending under one of the external flanges (6);
each external flange (6) comprises an essentially planar external surface which is at least partially flush with the external guiding face (5) with which it is aligned.

12 Claims, 10 Drawing Sheets

*(A-A)*

(I)

*(B-B)*

*(C-C)*

*(II)*

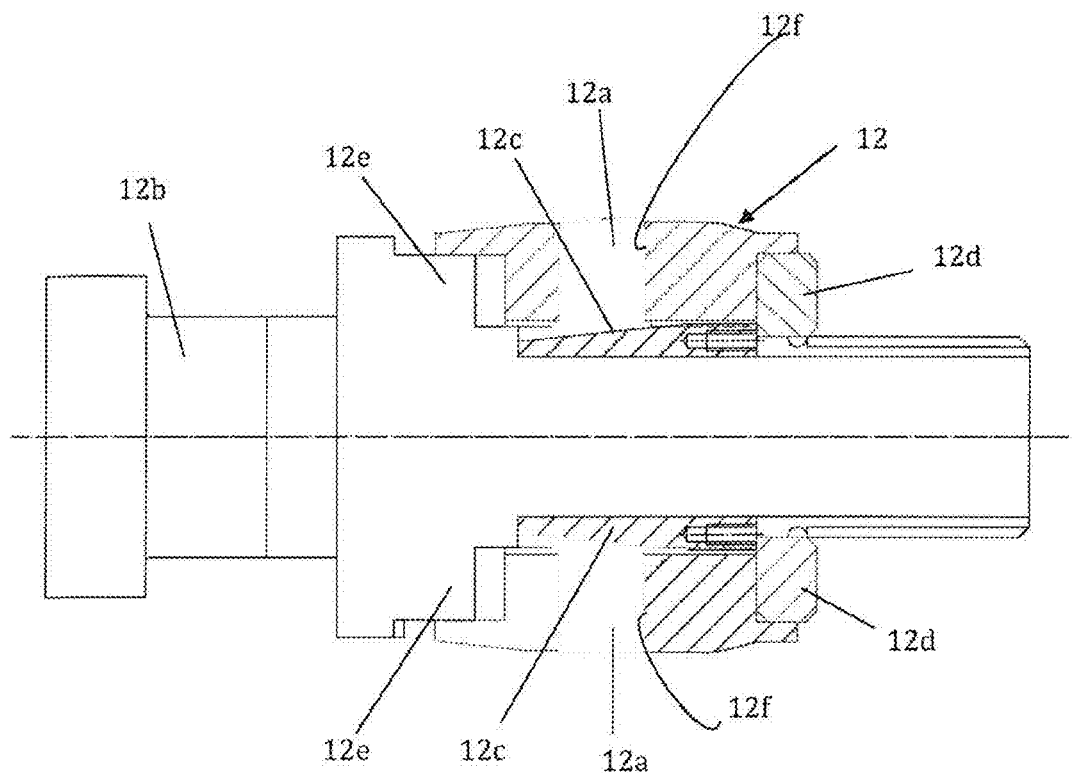
*Fig. 18*
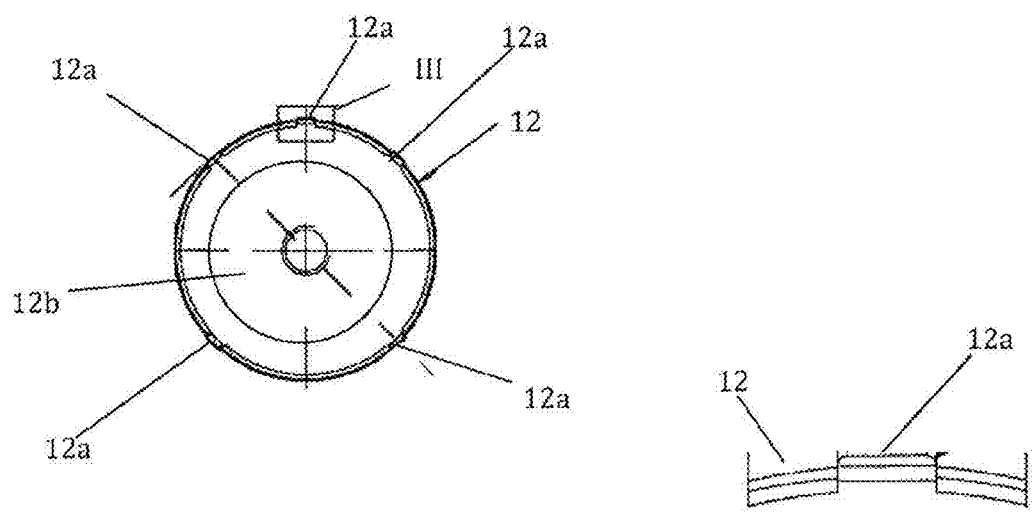
*Fig. 19*
*Fig. 20*
*(III)*

INNER TUBE FOR A TELESCOPIC STEERING COLUMN FOR AN AUTOMOTIVE VEHICLE, METHOD FOR FORMING A FIRST END SECTOR IN SUCH INNER TUBE AND REDUCING AND DRAWING DEVICE FOR FORMING THE END

This application is the U.S. National Stage Application of PCT/ES2013/070428 filed Jun. 27, 2013, which claims priority from EP application No. 12382371.8 filed Sep. 24, 2012.

TECHNICAL FIELD OF THE INVENTION

The present invention is encompassed in the technical field of telescopic steering columns for automotive vehicles, and particularly encompassed in the sector of inner tubes in such steering columns.

BACKGROUND OF THE INVENTION

Steering columns for vehicles tend to be formed by a steering shaft attached at one of its ends to the steering wheel and at the other end to the wheel axle, usually for the front wheels, of the vehicle by means of a universal joint. The axle can rotate inside a support structure fixed in the vehicle frame. The support structure can comprise an anchoring support and a tubular part, inside which the steering shaft rotates in bearings. Currently, it is very common for the steering wheel to be movable in depth, both for the purpose of being adjustable for the driver and for the purpose of damping the force of impacts in case of frontal collisions, for which purpose the tubular part comprises an outer welded bracket or tube and an inner tube which can move telescopically in the outer bracket or tube so that the steering wheel can be adjusted to different depths and so that the tubular part collapses in the case of a vehicle collision. It is also very common that the steering wheel can be adjusted in height, for which purpose the outer bracket or tube is assembled in the anchoring support by means of assembly systems which allow the angular lowering of the steering wheel.

In order to achieve a good slide between the inner tube and the outer bracket or tube, there have been provided outer tubes having a polygonal, usually orthogonal, outer cross-section provided on the external surface with longitudinal and planar external guiding faces which are guided in complementary facets provided inside the outer bracket or tube. In some steering columns it is foreseen that for supporting the bearings in which the inner rotating drive shaft from the steering wheel inside the inner tube rotates, the inner tube must have at least two end sectors having a circular cross-section in which the respective bearings are supported and delimiting between one another an intermediate sector having an outer polygonal cross-section with the mentioned external faces, one of the end sections must also conveniently have planar external areas that are a continuation of at least some of the planar faces of the intermediate sector in order to ensure a better slide, both in the adjustment of the depth of the steering wheel and in the case of collision.

Outer tubes having the mentioned end sector having a circular section and said planar external areas are known, obtained from a tube having a polygonal outer cross-section with an inner passage having a circular cross-section and a diameter less than that of the bearing which must be assembled in that end sector and increase the diameter of the inner passage in the corresponding end part of the inner tube by means of machining. These outer tubes must have enough wall thickness so as to be able to perform machining in said end part, so they are heavy, they require a lot of material mass truly unnecessary for their function, and imply a machining process, all of which increases the cost of the inner tube in terms of the material used and the manufacturing process.

DESCRIPTION OF THE INVENTION

The present invention aims to overcome the drawbacks of the state of the art detailed above by means of an inner tube for a telescopic steering column for an automotive vehicle, a method for forming a first end sector in such inner tube, and a reducing and drawing device for forming the end.

The inner tube for a telescopic steering column according to the present invention comprises a first end sector for assembling a bearing and having a substantially circular cross-section obtained by reducing and drawing, along with a second end sector and an intermediate sector having a regular polygonal section, provided with longitudinal planar external guiding faces, and is characterised in that the first end sector comprises a plurality of external flanges emerging longitudinally from its external surface in axial alignment with at least some of the external guiding faces, and a plurality of longitudinal internal recesses penetrating its inner surface, each internal recess extending under one of the external flanges; and each external flange comprises an essentially planar external surface which is at least partially flush with the external guiding face with which it is aligned.

According to the invention the invention, the second end sector of the inner tube can have a circular cross-section obtained by reducing and drawing.

Each internal recess is preferably less wide than the external flange under which it extends. Each internal recess is also preferably less deep than the thickness of the wall of the first end sector.

In order to ensure correct support of the bearing in the first end part of the inner tube, the internal recesses preferably have an angular extension as a whole such that their non-contact area bordering the bearing is less than 20%.

The inner tube preferably has a polygonal cross-section with an even number of sides, provided with at least six external guiding faces, and more preferably an octagonal cross-section with eight external guiding faces.

The first end sector can comprise an equal number of external flanges as external guiding faces. Alternatively, the first sector can comprise fewer external flanges than external guiding faces. In the lager case, the first end sector may not have an external flange axially aligned with the external guiding face which is arranged in a higher position in the inner tube assembly position. Alternatively or complementarily, the first external sector may not have external flanges axially aligned with two external guiding faces diagonally facing one another. Therefore, the first end sector can have one, two or three external flanges less than the total number of external guiding faces which, applied to the case of eight external guiding faces in the intermediate sector of the tube, would result in the presence of 7, 6 or 5 external flanges.

According to the invention, the method for forming a first end sector of an inner tube for a telescopic steering column comprising said first end sector for assembling a bearing and having a substantially circular cross-section obtained by reducing and drawing, a second end sector and an intermediate sector having a regular polygonal section, provided with longitudinal planar external guiding faces, which comprises inserting a drawing ball inside the end part, reducing a first end part having a polygonal cross-section of the inner tube corresponding to the polygonal section of the intermediate sector of the inner tube by means of a conical reducing cavity of an outer tool moving forward on it, and drawing the first end part by means of extracting the drawing ball working against the outer tool to obtain the reduced and drawn first end sector, and removing the outer tool, and is characterised in that inserting a drawing ball provided with a plurality of inserts inside the end part of the inner tube for forming respective internal recesses longitudinally penetrating the inner surface of the first end part in respective positions which will be under the external flanges reducing by means of moving forward on the end part of the inner tube in a conical reducing cavity comprising axial grooves sized and distributed along the periphery of the conical reducing cavity for forming a plurality of external flanges longitudinally emerging on the external surface of the first end part and axially aligned with at least some of the external guiding faces, each external flange comprising an essentially planar external surface which is at least partially flush with the external guiding face with which it is aligned;

drawing the first internal end part of the inner tube working against the axial grooves of the conical reducing cavity of the outer tool arranged in axial alignment with the inserts by means of extracting the drawing ball and in axial alignment with the external guiding faces of the intermediate sector of the inner tube.

Finally, the reducing and drawing device for forming a first end sector of an inner tube for a telescopic steering column, comprising said first end sector for assembling a bearing and having a substantially circular cross-section obtained by reducing and drawing a first end part having a polygonal cross-section of the inner tube, a second end sector and an intermediate sector having a regular polygonal section, provided with longitudinal planar external guiding faces, comprises an outer tool with a conical reducing cavity, a drawing ball which can be inserted inside the end part of the inner tube, and, according to the invention, is characterised in that the conical reducing cavity comprises axial grooves sized and distributed along the periphery of the conical reducing cavity for forming a plurality of external flanges longitudinally emerging on the external surface of the first end part and axially aligned with at least some of the external guiding faces, each external flange comprising an essentially planar external surface which is at least partially flush with the external guiding face with which it is aligned;

the drawing ball comprises a plurality of inserts for forming respective internal recesses longitudinally penetrating the inner surface of the first end part in respective positions under the external flanges;

the axial grooves of the conical reducing cavity of the outer tool are arranged in axial alignment with the inserts of the drawing ball.

According to that shown by the foregoing, the present invention overcomes the drawbacks of the state of the art mentioned above by means of the inner tube for a telescopic steering column for an automotive vehicle, the method for forming a first end sector in such inner tube, and the reducing and drawing device for forming the end, the features of which are detailed in the present description.

BRIEF DESCRIPTION OF THE DRAWINGS

Aspects and embodiments of the invention are described below based on schematic drawings in which

FIG. 18 is a longitudinal cross-section view of the drawing ball shown in FIG. 18;

FIG. 19 is a rear plan view of the drawing ball shown in FIG. 18;

FIG. 20 is a view of detail III marked in FIG. 19;

Figure 1:
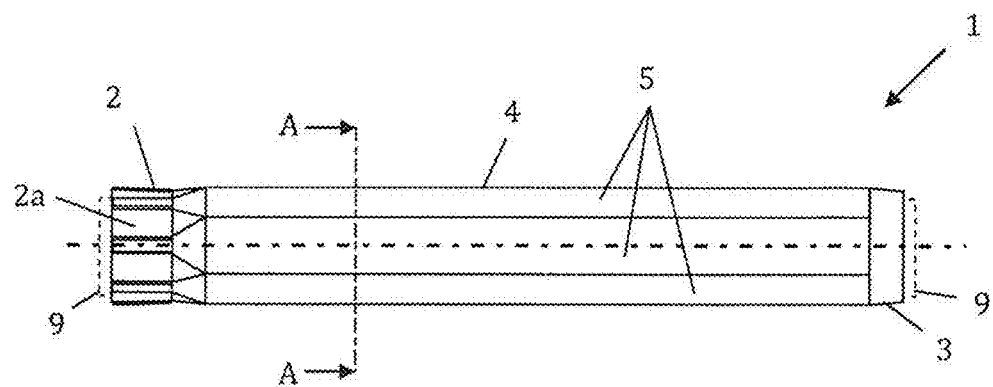
FIG. 1 is a longitudinal elevational view of a first embodiment of the outer tube according to the present invention.
Figure 2:
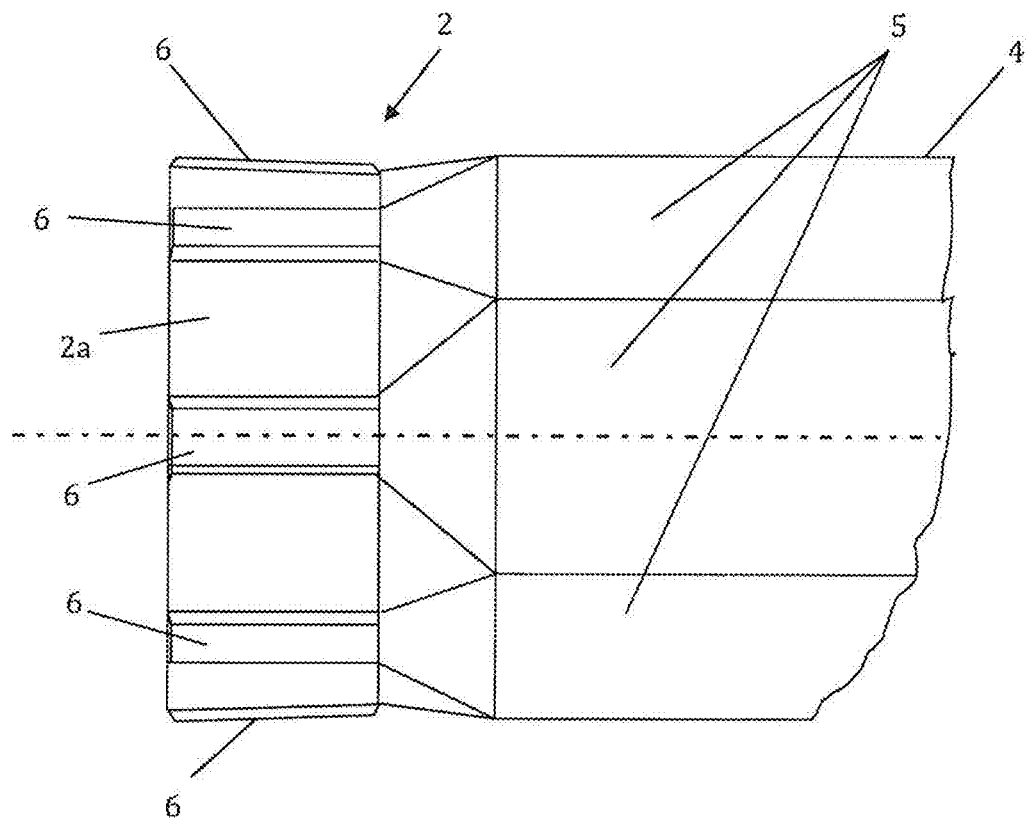
FIG. 2 is an enlarged view of the first end sector of the outer tube shown in FIG. 1.
Figure 3:
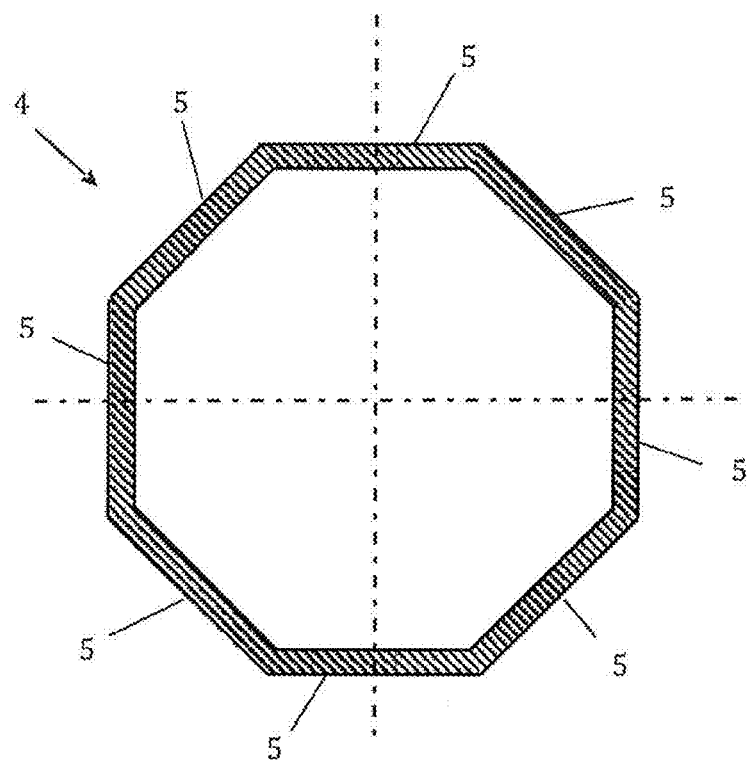
FIG. 3 is a cross-section view along line A-A marked in FIG. 1.
Figure 4:
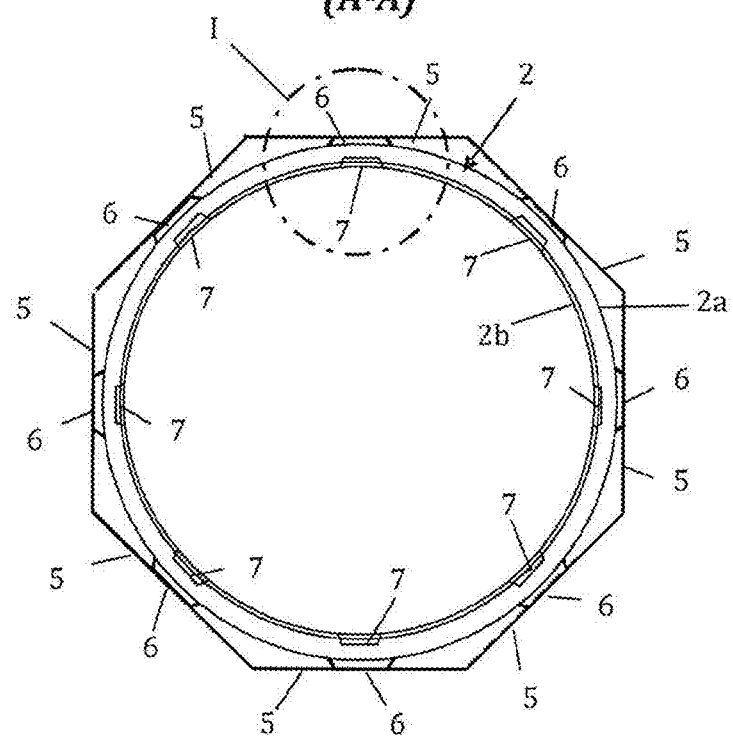
FIG. 4 is a front view of the first end sector of the inner tube shown in FIGS. 1 and 2.
Figure 5:
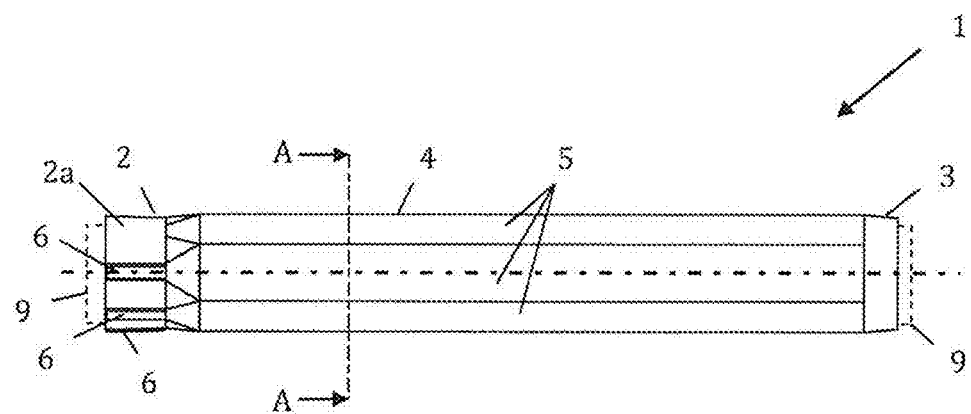
FIG. 5 is a longitudinal elevational view of a second embodiment of the outer tube according to the present invention.
Figure 6:
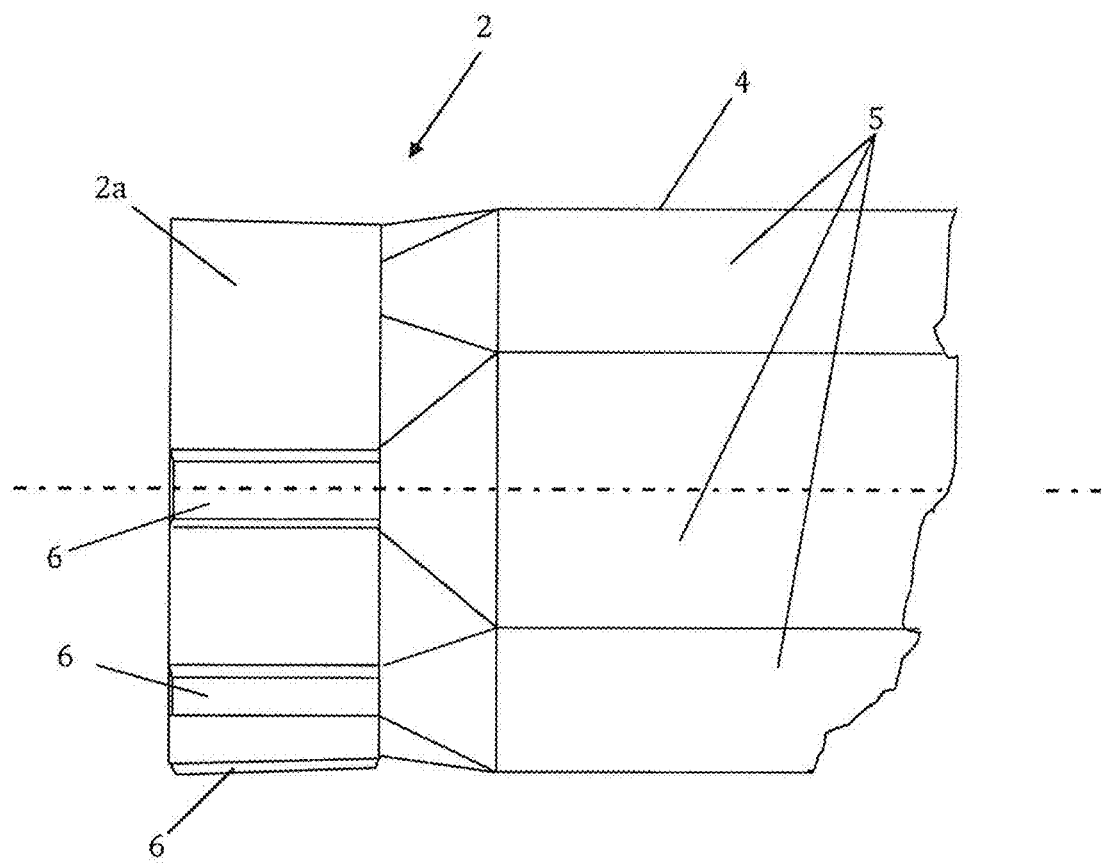
FIG. 6 is an enlarged view of the first end sector of the outer tube shown in FIG. 5.
Figure 7:
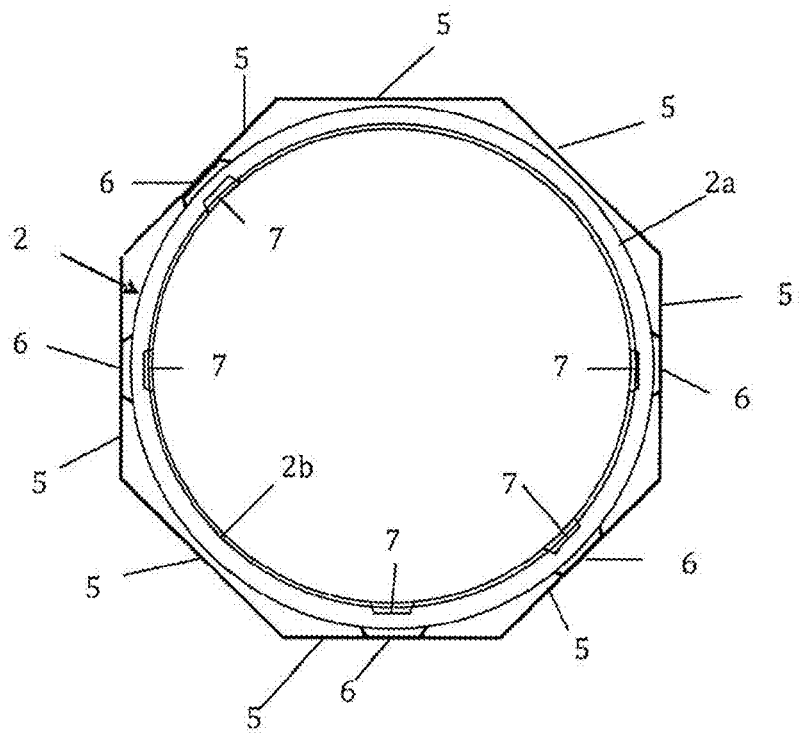
FIG. 7 is a front view of the first end sector of the inner tube shown in FIGS. 5 and 6.
Figure 8:
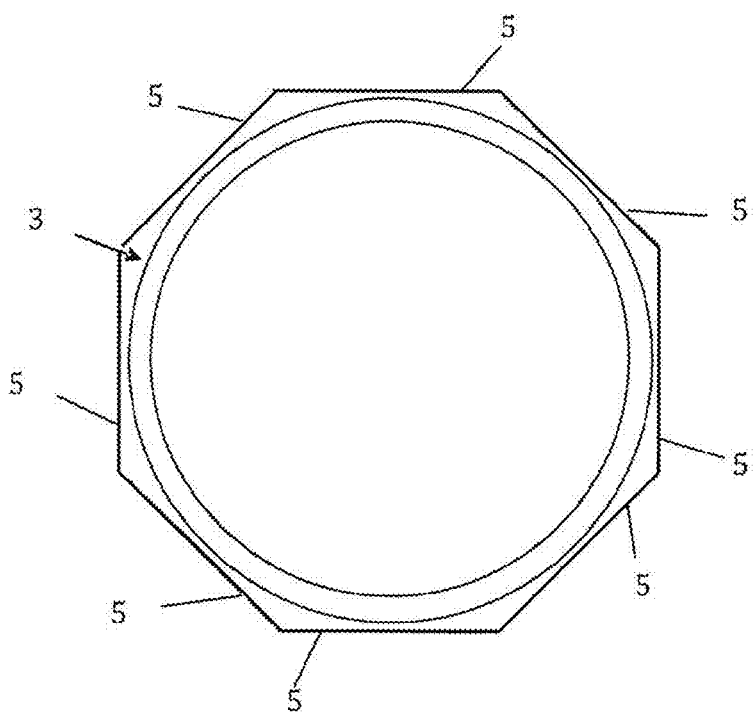
FIG. 8 is a front view of the second end sector of the inner tube shown in FIGS. 1 and 5.

Reference numbers identifying the following elements appear in these drawings:
1 inner tube
2 first end sector
2a external surface
2b inner surface
3 second end sector
4 intermediate sector
5 external guiding faces
6 external flanges
7 internal recesses
8 telescopic steering column
9 bearing
10 outer tool
11 conical reducing cavity
11a axial grooves
11b polygonal sector
11c cylindrical sector
11d reducing ribs
12 drawing ball
12a inserts
12b fixing body
12c ring-shaped cone wedge
12d adjusting washer
12e radial thicknessing
12f housing radial
13 drawing machine 13a first shaping too
13b intermediate tool
13c second shaping tool
14 anti-rotation system
15 pre-guiding tool
16 ejector mechanism
17 external tool
18 internal tool
19 pre-guiding tool
20 ejection mechanism
21 fixing bracket
21a lower lugs
21b cradle
22 outer semitube
23 tightening shoes
24 cross rod
25 adjusting lever

EMBODIMENTS OF THE INVENTION

FIGS. 1 to 10 illustrate two embodiments of an inner tube for a steering column. In both embodiments the inner tube comprises a first end sector —2— for assembling a bearing —9— and having a substantially circular cross-section obtained by reducing and drawing, a second end sector —3—, also for assembling another bearing —9—, as well as an intermediate sector —4— having a regular octagonal section provided with eight longitudinal planar external guiding faces —5—.

The first end sector —2— comprises a plurality of external flanges —6— emerging longitudinally from its external surface —2a— in axial alignment with at least some of the external guiding faces —5—, and a plurality of longitudinal internal recesses —7— penetrating its inner surface —2b— while the second end sector —3— of the inner tube —1— has a circular cross-section, also obtained by reducing and drawing.

Figure 9:
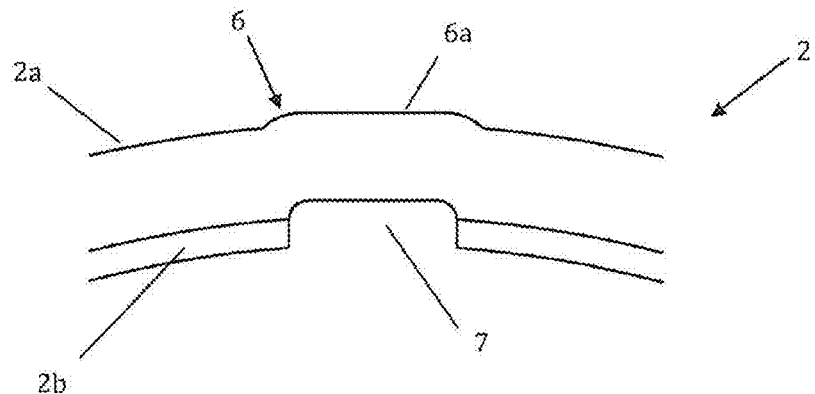
FIG. 9 is a view corresponding to detail I marked in FIG. 4.

Each internal recess —7— of the first end sector —2— of the inner tube —1— extends axially under one of the external flanges —6—, and each external flange —6— comprises an essentially planar external surface which is at least partially flush with the external guiding face —5— with which it is aligned. As seen in FIG. 9, each internal recess —1— is less wide than the external flange —6— under which it extends, and less deep than the thickness of the wall of the first end sector —2—.

In order to correctly support the corresponding bearing —9—, the internal recesses —7— have an angular extension as a whole such that theft non-contact area bordering the bearing —9— is less than 20%.

The two embodiments shown in FIGS. 1 to 8 are differentiated in that in the embodiment shown in FIGS. 1 to 4, the end sector has eight external flanges —6—, i.e., one external flange —6— for each external guiding —5—, while in the embodiment of FIGS. 5 to 8, the first end sector —2— comprises fewer external flanges —6— than external guiding faces —5—. Specific-ally, the first end sector —2— shown in FIGS. 5 to 8 does not have an external flange —6— axially aligned with the external guiding face —5— which would be arranged in a higher position in the inner tube —1— assembly position, nor does it have external flanges —6— axially aligned with two of the external guiding faces —5— diagonally facing one another of the intermediate sector, i.e., it only has five external flanges —6— on its external surface —2a— and, therefore, only five corresponding recesses —7— on its inner surface —2b—. This embodiment is ideal for those steering columns which are open at their part upper, at least in the area in which the first end sector —2— of the inner tube —1— is located.

FIGS. 10 to 22 illustrate an embodiment of a reducing and drawing device which is used for shaping the end sectors —2, 3— of an inner tube —1— like that illustrated in FIGS. 5 to 9.

Figure 10:
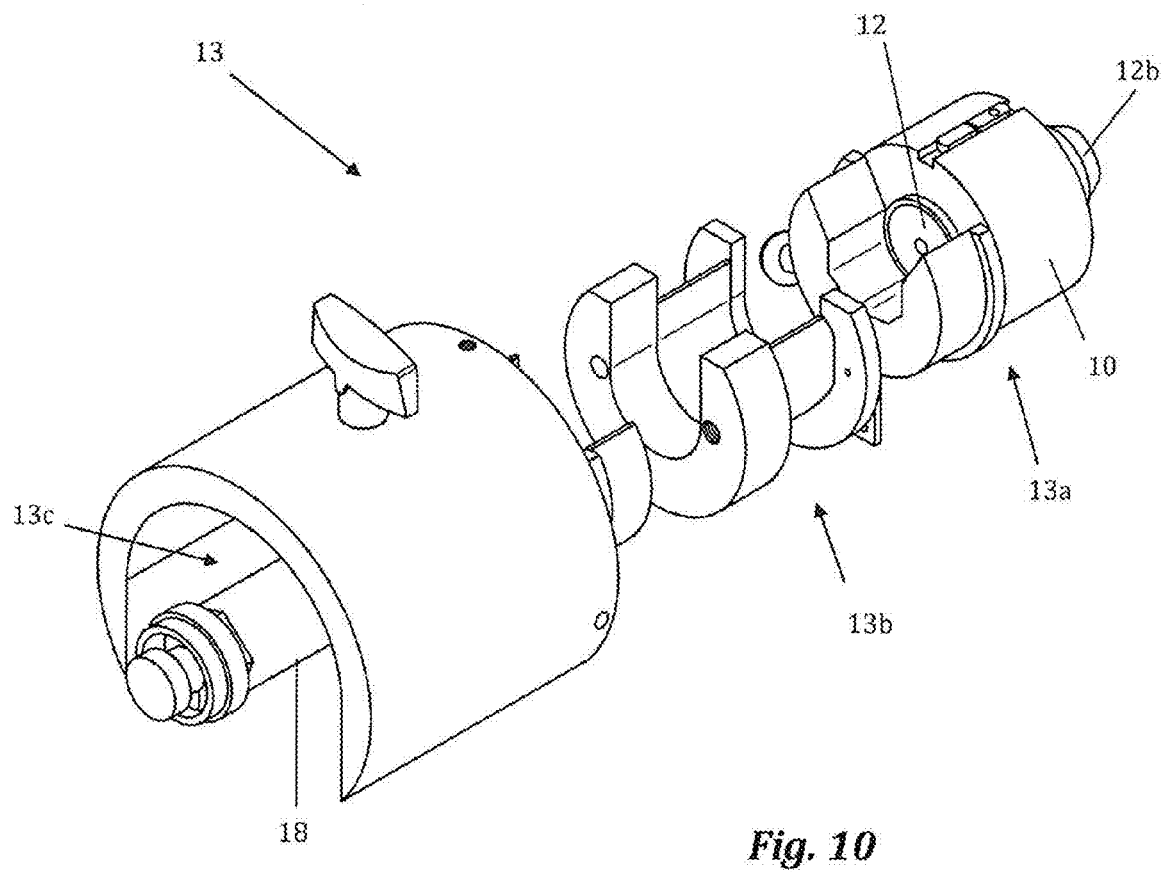
FIG. 10 is a perspective view of an embodiment of a reducing and drawing device according to the present invention which is used for shaping the first end sector of the tube shown in FIGS. 5 to 9.
Figure 11:
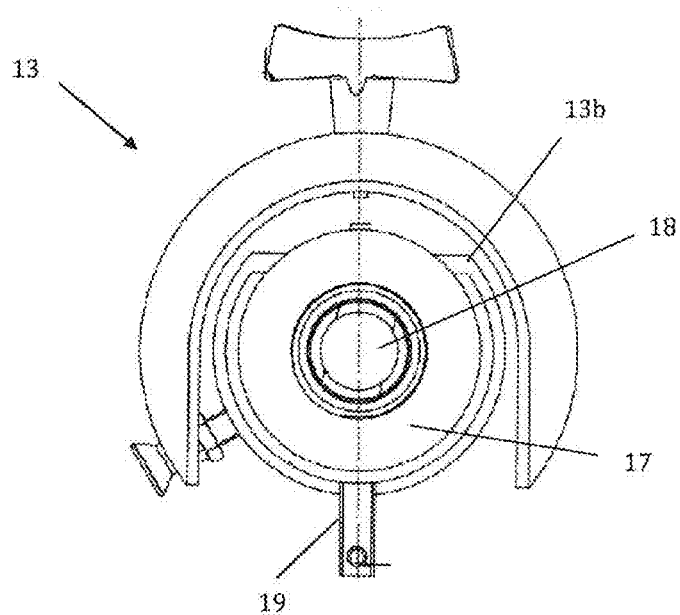
FIG. 11 is a front elevational view of the device shown in FIG. 10.
Figure 12:
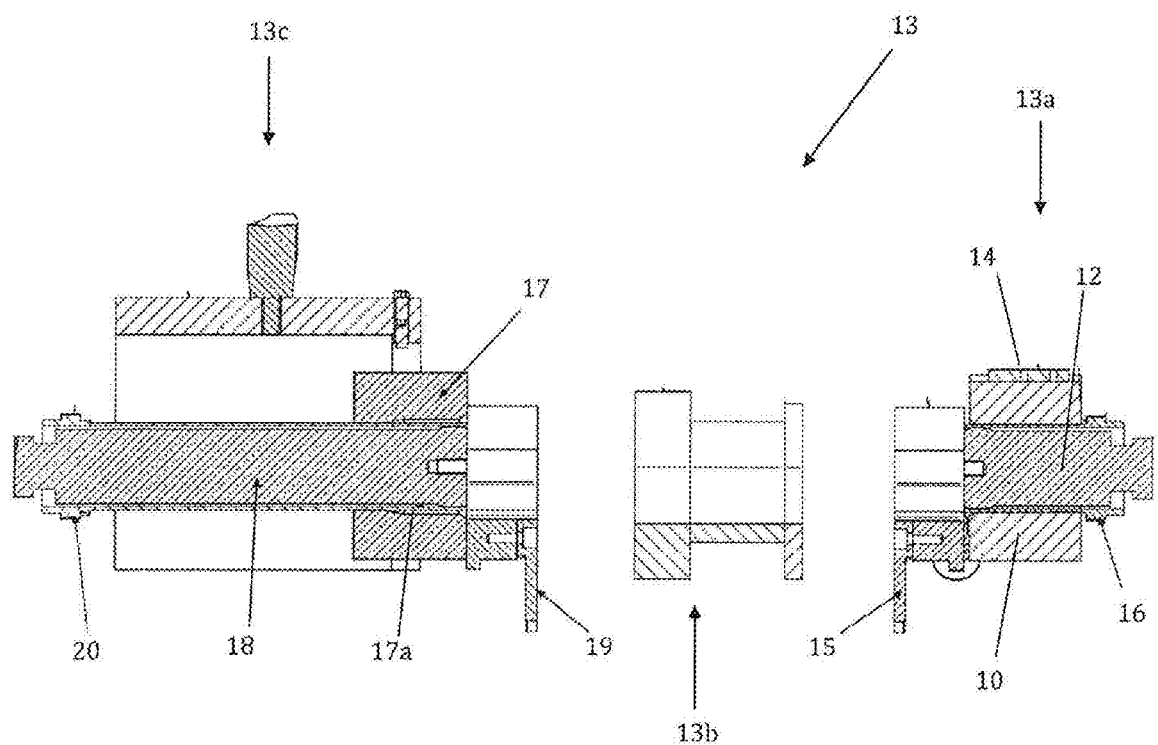
FIG. 12 is a longitudinal section view of the device shown in FIG. 10.
Figure 13:
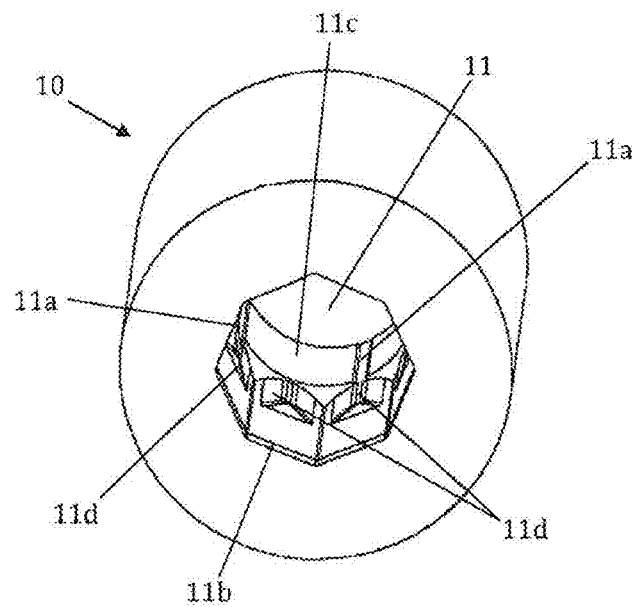
FIG. 13 is a perspective view of the outer tool for the device shown in FIG. 10.
Figure 14:
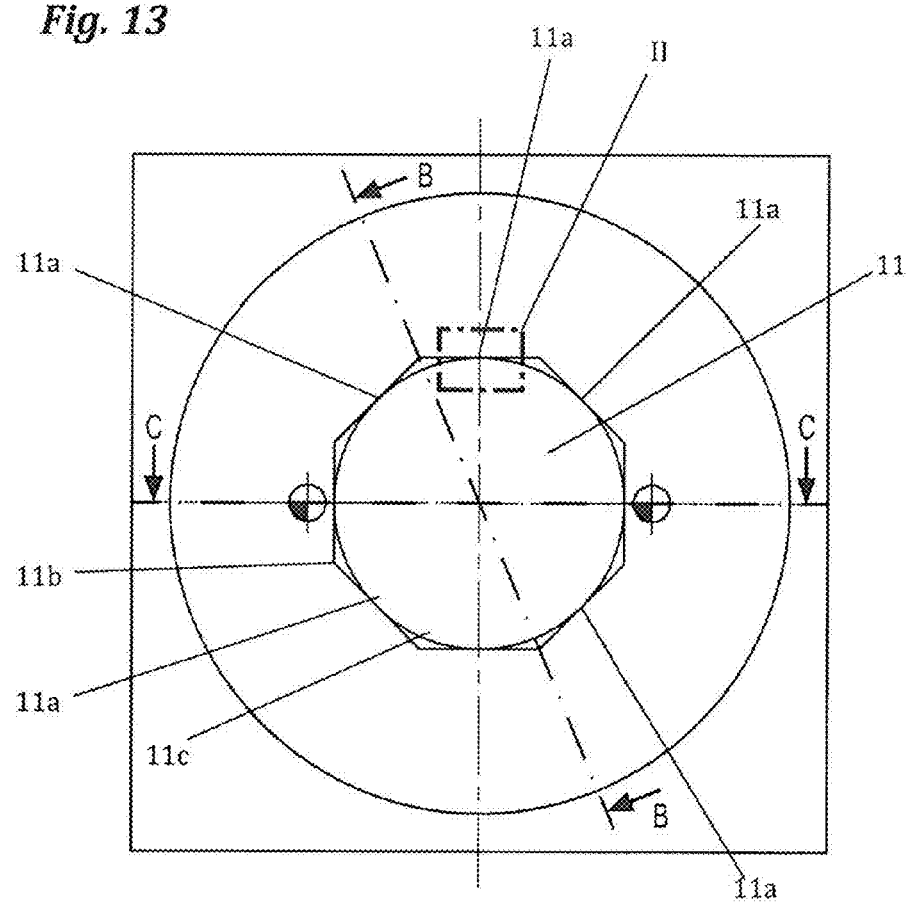
FIG. 14 is an elevational view of the tool shown in FIG. 13.
Figure 15:
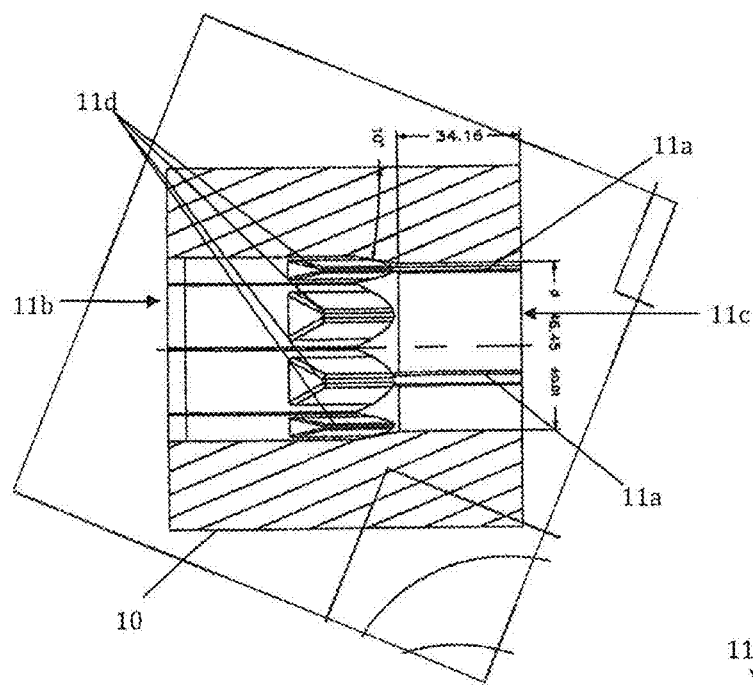
FIG. 15 is a cross-section view along B-B marked in FIG. 14.
Figure 16:
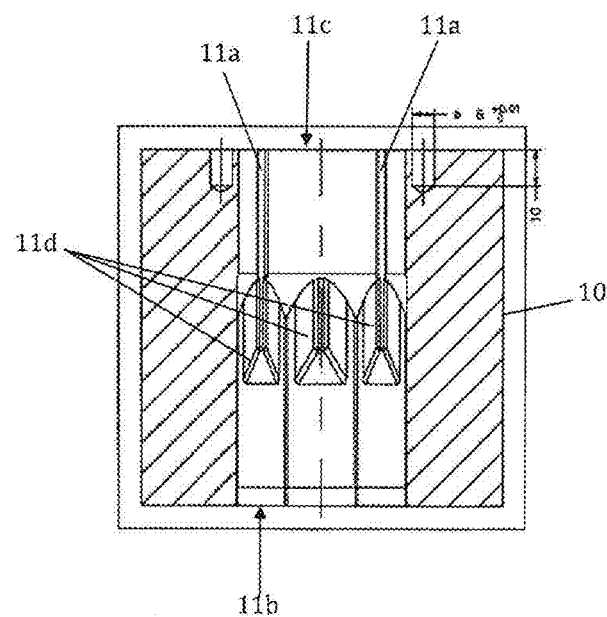
FIG. 16 is a cross-section view along C-C marked in FIG. 14.
Figure 17:
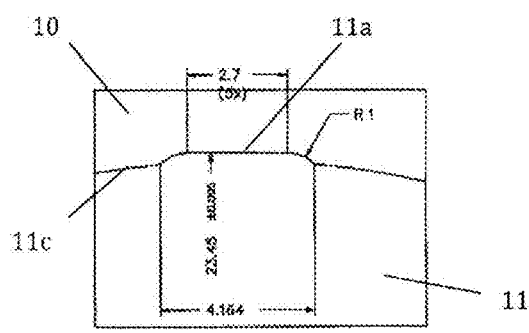
FIG. 17 is a view of detail II marked in FIG. 14.

FIGS. 10, 11 and 12 show the assembly and arrangement of the reducing and drawing tools of both ends of the inner tube in an embodiment of a reducing and drawing device —13— for carrying out the process.

As Can be seen, the reducing and drawing device —13— comprises a first shaping tool —13a— for shaping the first end sector —2— of the inner tube —1—, a intermediate tool —13b— and a second shaping tool —13c— for shaping the second end sector —3— of the inner tube —1—.

The first shaping tool —13a— comprises an outer tool —10— as an outer bushing and an inner tool —12— in the form of a drawing ball, an anti-rotation system —14— in the form of a pin, a pre-guiding tool —15— for the inner tube —1— which is to be formed as well as an ejector mechanism —16—. As will be described below, the outer tool —10— comprises an axial conical cavity for reducing with the shape of turrets the first end sectors —2— of the inner tube, furthermore axial grooves for making the external flanges —8— which are flush with the external guiding faces —5— of the inner tube 1—. In order to obtain said external flanges —6—, the axial grooves of the outer tool —10— have to be aligned with projections of the inner tool —12— in the same angular position, so the first tool —13a— comprises the mentioned anti-rotation system —14—. The pre-guiding tool —15— is used for pre-guiding the entry of the inner tool —12— into the inner tube —1—.

The second shaping tool —13c— comprises an external tool —17— as an outer bushing and an internal tool —18—, a pre-guiding tool —19— for the inner tube —1— which is to be shaped as well as an ejection mechanism —20—. The outer tool —17— comprises an axial conical passage —17a— through which the internal tool —18— moves for shaping the second end —3— of the inner tube —1—.

The intermediate tool —13b— acts as a mechanical stop for stopping the forward movement of the outer tool —10— of the first shaping tool —13a— and of the second shaping tool —13b—.

The outer tool —10— illustrated in FIGS. 13 to 17 comprises a conical reducing cavity —11— with a sector having an octagonal cross-section —11b— and a cylindrical sector —11c—. The sector having an octagonal cross-section —11 b— of the conical reducing cavity —11— has eight reducing ribs —11d—, one on each of the outer faces corresponding to the skies of the octagon in its area bordering the cylindrical sector —11c—. The cylindrical sector —11b— has five axial grooves —11a— along its internal periphery in axial alignment with five of the internal faces of the sector having an octagonal cross-section —11b—.

On the other hand, the drawing ball —12— shown in FIGS. 18 to 20 comprises a plurality of inserts —12a— for drawing the external flanges —6—, a fixing body —12b— whereby the drawing ball —12— can be immobilized in the reducing and drawing machine, a ring-shaped cone wedge —12c— and an adjusting washer —12d—.

It can be seen that the drawing ball —12— is ring-shaped and is assembled with the capacity to slide axially in the fixing body —12b— between a radial thicknessing —12e— and the adjusting washer —12d—. The inserts —12a— are assembled with the capacity to move radially in respective radial housings —12f— of the drawing ball —12—, and their internal bases are supported radially in the ring-shaped wedge —12c—. This arrangement allows that when the drawing ball —12— moves forward inside the first end part of the inner tube —1—, it is supported in the radial thicknessing —12e— such that the inserts —12a— are positioned in the lowest part of the ring-shaped wedge —12c— and the external surfaces of the inserts —12a— are flush with the outer surface of the drawing ball —12—. On the other hand, when the drawing ball —12— is extracted from the first end part of the inner tube —1—, it is supported in the adjusting washer —12d—, such that the inserts —12a— are positioned in the highest part of the ring-shaped wedge —12c— and the external surfaces of the inserts —12a— emerge from the outer surface of the drawing ball —12— and are therefore susceptible to forming the external flanges —6—.

In order to shape the first end sector —2— of the inner tube —1—, a first end part having an octagonal cross-section of the inner tube —1— is inserted in the sector having an octagonal cross-section of the conical reducing cavity —11— of the outer tool —10— and the drawing ball —12— is inserted inside said end part of the inner tube —1—. Then the device is operated for reducing and drawing the first end part by means of the outer tool —10— and the drawing ball —12—. Since the axial grooves —11a— are sized and distributed along the periphery of the conical reducing cavity —11— and since they are axially aligned with the inserts —12a— of the drawing ball —12— as well as in axial alignment with the external guiding faces —5— of the intermediate sector —4— of the inner tube —1—, the external flanges —6— longitudinally emerging on the external surface —2a— of the first end part —2'— and the internal recesses —7— longitudinally penetrating the inner surface —2b— of the first end part in respective positions under the external flanges —6— are formed by means of reducing and drawing.

Figure 21:
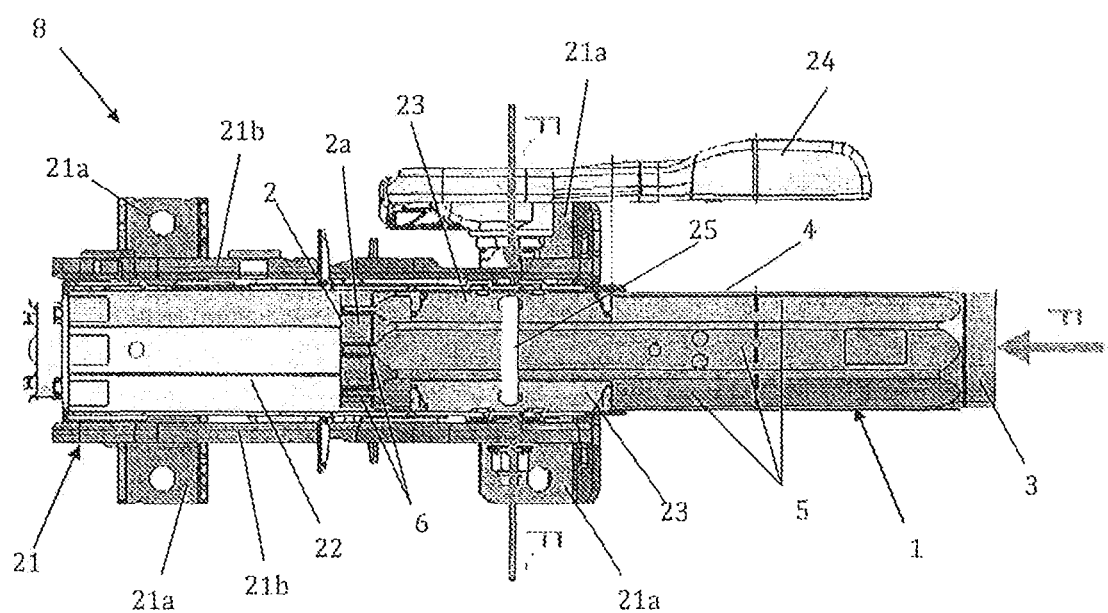
FIG. 21 is an upper plan view of an embodiment of a telescopic steering column to which the inner tube according to the present invention is applicable.

As shown in FIG. 21, the inner tube —1— can be integrated in a telescopic steering column —8— comprising a fixing bracket —21— which can be assembled in a vehicle (not shown in the drawings) for which it is provided with four lower lugs —21a— shaping a cradle —21b— in which a rotating outer semitube —22— in which the inner tube —1— is axially movable is axially immobilized. The outer semitube —22— has an internal octagonal cross-section complementary to the octagonal profile formed by the external guiding faces —5— of the intermediate sector —4— of the inner tube —1—, such that the inner tube —1— is axially guided in the outer semitube —22— by these external guiding faces —5— and their external flanges —6— provided in its first end part —2—. The inner tube —1— can be axially immobilized in the cradle —21b— in a conventional manner by means of a pair of tightening shoes —23— attached to respective external guiding faces —5— of the inner tube —1— and susceptible to exerting a tightening force —F— on the external guiding faces —5—. The tightening shoes —23— are connected to a conventional tightening mechanism comprising a tightening cross rod —24— connected to an adjusting lever —25— whereby the operation of which loosens/tightens the fit of the tightening shoes —23— and, therefore, the longitudinal position of the outer tube —2— and, accordingly, the adjustment in depth of the steering wheel of the vehicle, can be adjusted.

The invention claimed is:

1. Inner tube for a telescopic steering column (8), with a first end sector (2) for assembling a bearing (9) and having a substantially circular cross-section obtained by reducing and drawing, a second end sector (3) and an intermediate sector (4) having a regular polygonal section, provided with longitudinal planar external guiding faces (5), characterised in that the first end sector (2) comprises a plurality of external flanges (6) emerging longitudinally from its external surface (2a) in axial alignment with at least some of the external guiding faces (5), and a plurality of longitudinal internal recesses (7) penetrating its inner surface (2b), each internal recess (7) extending under one of the external flanges (6);

each external flange (6) comprises an essentially planar external surface which is at least partially flush with the external guiding face (5) with which it is aligned.

2. Inner tube according to claim 1, characterised in that each internal recess (7) is less wide than the external flange (6) under which it extends.

3. Inner tube according to claim 1, characterised in that each internal recess (7) is less deep than the thickness of the wall of the first end sector (2).

4. Inner tube according to claim 1, characterised in that the internal recesses (7) have an angular extension as a whole such that their non-contact area bordering the bearing (9) is less than 20%.

5. Inner tube according to claim 1, characterised in that the intermediate sector (4) has a polygonal cross-section with an even number of sides, provided with at least six external guiding faces (5).

6. Inner tube according to claim 5, characterised in that the intermediate sector (4) has an octagonal cross-section with eight external guiding faces (5).

7. Inner tube according to claim 5, characterised in that the first end sector (2) comprises fewer external flanges (6) than external guiding faces (5).

8. Inner tube according to claim 7, characterised in that the first end sector (2) does not have an external flange (6) axially aligned with the external guiding face (5) which is arranged in a higher position in the inner tube (1) assembly position.

9. Inner tube according to claim 7, characterised in that the first end sector (2) does not have external flanges (6) axially aligned with two external guiding faces (5) diagonally facing one another.

10. Inner tube according to claim 1, characterised in that the second end sector (3) of the inner tube (1) has a circular cross-section obtained by reducing and drawing.

11. Method for forming a first end sector (2) of an inner tube (1) for a telescopic steering column (8), comprising said first end sector (2) for assembling a bearing (9) and having a substantially circular cross-section obtained by reducing and drawing, a second end sector (3) and an intermediate sector (4) having a regular polygonal section, provided with longitudinal planar external guiding faces (5), which comprises inserting a first end part having a polygonal cross-section of the inner tube (1) corresponding to the polygonal section of the intermediate sector (3) of the inner tube (1) in a conical reducing cavity (11) of an outer tool (10) and inserting a drawing ball (12) inside the first end part, and reducing and drawing the first end part by means of the outer tool (10) and the drawing ball (12) to obtain the reduced and drawn first end sector (2), extracting the drawing ball (12) and removing the inner tube (1) from the outer tool (10), characterised in that inserting the end part of the inner tube in a conical reducing cavity (11) comprising axial grooves (11a) sized and distributed along the periphery of the conical reducing cavity (11) for forming a plurality of external flanges (6) longitudinally emerging from the external surface (2a) of the first end part (2') and axially aligned with at least some of the external guiding faces (5), each external flange (6) comprising an essentially planar external surface which is at least partially flush with the external guiding face (5) with which it is aligned;

inserting inside the end part (2) of the inner tube (1), a drawing ball (12) provided with a plurality of inserts (12a) for forming respective internal recesses (7) longitudinally penetrating the inner surface (2b) of the first end part in respective positions under the external flanges;

drawing and reducing the first end part of the inner tube (1) with the axial grooves (11a) of the conical reducing cavity (11) of the outer tool (10) arranged in axial alignment with the inserts (12a) of the drawing ball (12) and in axial alignment with the external guiding faces (5) of the intermediate sector (4) of the inner tube (1).

12. Reducing and drawing device for forming a first end sector (2) of an inner tube (1) for a telescopic steering column (8) comprising said first end sector (2) for assembling a bearing (9) and having a substantially circular cross-section obtained by reducing and drawing a first end part having a polygonal cross-section of the inner tube (1), a second end sector (3) and an intermediate sector (4) having a regular polygonal section, provided with longitudinal planar external guiding faces (5), the device comprising an outer tool (10) with a conical reducing cavity (11), a drawing ball (12) which can be inserted inside the first end part of the inner tube (1), characterised in that the conical reducing cavity (11) comprises axial grooves (11a) sized and distributed along the periphery of the conical reducing cavity (11) for forming a plurality of external flanges (6) longitudinally emerging on the external surface (2a) of the first end part (2') and axially aligned with at least some of the external guiding faces (5), each external flange (6) comprising an essentially planar external surface which is at least partially flush with the external guiding face (5) with which it is aligned;

the drawing ball (12) comprises a plurality of inserts (12a) for forming respective internal recesses (7) longitudinally penetrating the inner surface (2b) of the first end part in respective positions under the external flanges;

the axial grooves (11a) of the conical reducing cavity (11) of the outer tool (10) are arranged in axial alignment with the inserts (12a) of the drawing ball (12).

* * * * *